C. F. ANDERSON.
Seed-Planter.
No. 24,185.
Patented May 31, 1859.
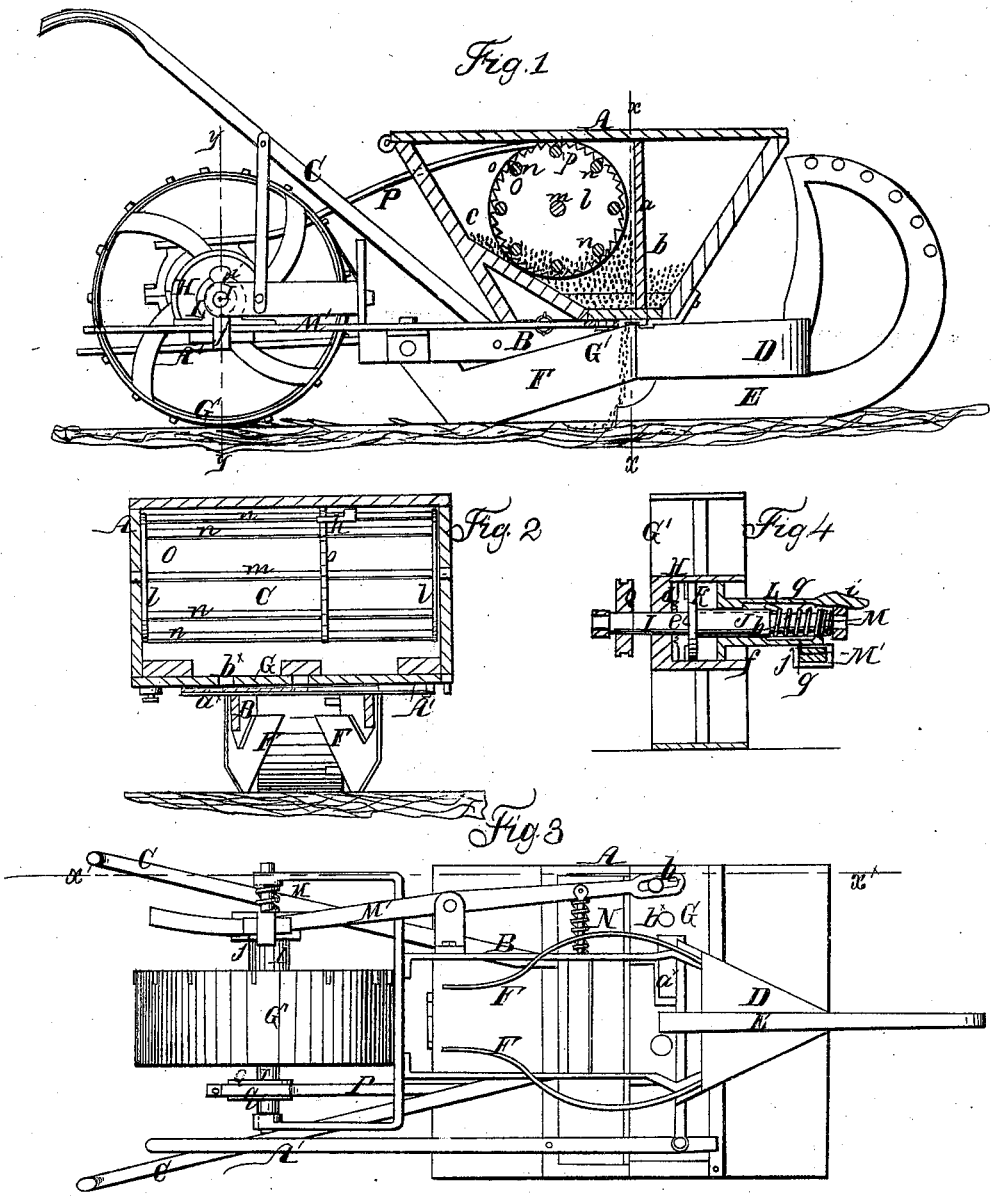
Witnesses:
Edw. W. Colton
George Alexander
Inventor:
C. F. Anderson

UNITED STATES PATENT OFFICE.

C. F. ANDERSON, OF CHARLESTOWN, NEW HAMPSHIRE.

IMPROVEMENT IN SEED-PLANTERS.

Specification forming part of Letters Patent No. 24,185, dated May 31, 1859.

*To all whom it may concern:*

Be it known that I, C. F. ANDERSON, of Charlestown, in the county of Sullivan and State of New Hampshire, have invented a new and Improved Seeding-Machine; and I do hereby declare that the following is a full, clear, and exact description of the same, reference being had to the annexed drawings, making a part of this specification, in which—

Figure 1 is a longitudinal vertical section of my invention, taken in the line $x'\ x'$, Fig. 3. Fig. 2 is a transverse vertical section of the same, taken in the line $x\ x$, Fig. 1; Fig. 3, an inverted plan of the same; Fig. 4, a transverse vertical section of the same, taken in the line $y\ y$, Fig. 1.

Similar letters of reference indicate corresponding parts in the several figures.

This invention relates to an improvement in that class of seeding-machines which are designed for planting seed in hills.

The object of the invention is to place the seed-distributing device under the complete control of the attendant, so that the dropping of the seed may be checked or prolonged to greater or less intervals to insure the even dropping of the same in check-rows.

To enable those skilled in the art to fully understand and construct my invention, I will proceed to describe it.

A represents a seed-box, which may be of the usual or any proper form, attached to a suitable frame, B, which has handles C C at its back end and a leveler and furrow-share, D E, at its forward end, covering-shares F F being attached to the back ends of the leveling-shares D. These parts are arranged as shown in Figs. 1, 2, and 3. The seed-box A has a vertical partition, $a$, placed in it, which divides the box into two parts—one, $b$, being for seed and the other, $c$, for the fertilizer. The front and back sides of the box A are inclined, and a reciprocating perforated slide, G, forms its bottom, the same bottom answering for both compartments $b\ c$.

In the back part of the frame B there is placed a wheel, G', the hub H of which is hollow and has ratchet-shaped projections $d$ formed on its inner end, as shown clearly in Fig. 4. The shaft I of the wheel passes longitudinally through the center of the hub H, and on the shaft I a tube, J, is placed and allowed to turn freely. On the inner side of the tube J a circular disk, K, is placed, said disk having ratchet-shaped projections $e$ formed on it. The tube J is fitted loosely within a tube, L, which has a spiral groove, $f$, made in it, and a longitudinal groove, $g$, the latter communicating with the back part of the former, as shown clearly in Fig. 4. On the exterior of the tube J a projection, $h$, is formed, said projection working in the grooves $f\ g$, as will be presently explained.

On the shaft I a spiral spring, M, is placed, said spring bearing against the outer end of the tube J.

To the outer end of the tube L a catch, $i$, is attached, the use of which will be presently shown.

To the under side of the tube L a loop, $j$, is secured, and through this loop a lever, M', passes. The front end of lever M' is secured by a pivot or pin, $k$, to the under side of the seed-slide G, as shown clearly in Fig. 3, and a spring, N, is attached to lever M'.

Within the compartment $c$ of the box A a cylinder, O, is placed and allowed to rotate freely. This cylinder is formed of two circular disks, $l\ l$, placed on a shaft, $m$, the disks being connected by longitudinal rods $n$, the ends of which are attached to the disks $l$ near their edges. The rods $n$ also pass through a ratchet, $o$, placed in the shaft $m$, into which ratchet a pawl, $p$, catches, said pawl being at the end of a rod, P, which passes through the back of the seed-box A, and has its back end attached to a strap, $q$, which encompasses an eccentric, Q, on the shaft I.

The operation is as follows: As the machine is drawn along the seed-slide G is vibrated in consequence of the projections $d$ of the hub H catching against the projections $e$ of the disk K and rotating the tube J, the projection $h$ of which forces outward the tube L, to which the lever M' is attached, in consequence of its working in the spiral groove $f$, said tube L being forced back by the spring M when the projection $h$ reaches the outer end of groove $f$ in consequence of the projection passing in line with the straight groove $g$. The seed is distributed at the termination of the quick movement of the slide given it by the spring M, and it will at once be seen that the distribution of the seed may be checked at any time by merely throwing out the outer end of the lever M' and causing the catch $i$ to hook over the edge of the bearing of shaft I. The attendant may operate this lever with his foot with the greatest facility and prolong the interval of the dropping of the seed as long as may be desired. By this arrangement the seed may be planted evenly in check-rows, for the attendant is enabled to correct any errors which might arise from an unevenness of the ground, and is also enabled to prevent the unnecessary distribution of seed in passing with the machine from place to place, in turning at the ends of rows, &c. The wheel G performs the usual function of a roller.

Having thus described my invention, what I claim as new, and desire to secure by Letters Patent, is—

The ratchet-shaped projections $d$ $e$ in the hub H of wheel B and on the disk K of the tube J, in connection with the tube L, provided with the spiral and straight grooves $f$ $g$, in which the projection $h$ of tube J is fitted, the tube L having the slide-lever M' attached, and also the catch $i$, the whole being combined and arranged to operate as and for the purpose set forth.

C. F. ANDERSON.

Witnesses:
EDWD. W. COLTON,
GEORGE ALEXANDER.